2,829,122

CONDENSATION PRODUCTS OF SULFONIC ACID, ALIPHATIC ALDEHYDE AND O-CHLOROPHENOL AND PROCESS OF PREPARATION

Heinrich Schultheis, Leverkusen-Bayerwerk, and Detlef Delfs, Opladen, Germany, assignors to Farbenfabriken Bayer Aktiengesellschaft, Leverkusen, Germany, a corporation of Germany No Drawing. Application June 9, 1953
Serial No. 360,614

Claims priority, application Germany June 10, 1952

7 Claims. (Cl. 260—49)

This invention relates to new condensation products having tanning action and to a process of producing same.

It is known to condense sulfonic acid of condensed polynuclear aromatic hydrocarbons, especially β-naphthalene sulfonic acid, with lower aldehydes, preferably formaldehyde, to products yielding aqueous solutions which dissolve phlobaphene and sludge upon addition of vegetable tanning solutions but do not yield leather of good quality in tanning by themselves (see German Patent 292,531). These products are employed in tanning as auxiliaries and are marketed under the name "auxiliary tanning agents." The field of application of these products is limited by their strong acidity prohibiting the addition of larger quantities to vegetable tanning solutions. The addition of larger quantities, say about more than 10 percent, impairs the quality of leather.

It is further known to produce products having tanning action by condensing for instance β-naphthalene sulfonic acid and p.p'-dihydroxydiphenyl-sulfone with formaldehyde. These products yield white or light leather of good body (see German Patent 611,671, U. S. Patent 2,282,264 and Swiss Patent 196,342). They do not show, however, the marked dispersing and phlobaphene dissolving action of the abovesaid auxiliary tanning agents.

The attempt of condensing simple phenols, for instance phenol and cresols, with sulfonic acids of aromatic hydrocarbons, which do not contain hydroxy groups, with formaldehyde, as a rule, leads to the formation of resinous materials, or the resulting products having tanning action show a strong tendency of precipitating solid, insoluble constituents.

The above products may be used under certain conditions as tannins but they suffer from the disadvantage that, apart from their lacking stability, their dispersing and sludge dissolving properties are poor.

We have now found that essentially improved stable tannins are obtained by condensing mono- or disulfonic acids of aromatic ring systems containing at least two condensed aromatic nuclei, for instance β-naphthalene sulfonic acid, α-methyl-naphthalene sulfonic acid, anthracene disulfonic acid, phenanthrene disulfonic acid and mixtures of these acids, with lower aldehydes, especially formaldehyde or substances releasing formaldehyde, and o-chloro-substituted phenols having at least one free o- or p-position, for instance o-chlorophenol and 6-chloro-m-cresol, in an acid medium. The condensation is carried out by introducing the chlorophenol and formaldehyde at the same time, preferably separately from each other into the aromatic sulfonic acid in accordance with the reaction velocity while stirring at elevated temperature, preferably within the range of 80–130° C. In most cases the sulfonation mixture is used in the form as it is obtained from the hydrocarbon and the sulfonating agents, for instance sulfuric acid monohydrate and concentrated sulfuric acid. When using for instance anthracene disulfonic acids, small quantities of water may be added before or during the reaction to keep the reaction mixture stirrable at the desired temperature. The addition of o-chlorophenol and formaldehyde is regulated so that either the addition of both products is finished at the same time or that a smaller portion of the aldehyde, say 1–5 percent, is introduced after the addition of o-chlorophenol; the latter method is preferably adopted in the condensation of the aromatic sulfonic acids with larger quantities of aldehyde.

By this process up to about two mols of o-chlorophenol per one mol of aromatic acid can be condensed to a highly viscous brown sirup without impairing the stability of the product. The sirup is subsequently neutralized in known manner, for instance with aqueous ammonia, and adjusted to a pH of about 2.0–4.0, preferably 2.5–3.5, with acid, for instance formic acid and/or acetic acid.

The new condensation products obtained according to the invention are stable on storage for an indefinite time, compatible with vegetable tannins in every proportion and yield a fully tanned, light leather. Furthermore, they disperse and dissolve the sludge and the phlobaphene of organic tanning solutions. This property is especially inherent in products produced by condensing 0.5–1.5 mols of o-chlorophenol with 0.75–1.3 mols of formaldehyde and 1 mol of β-naphthalene sulfonic acid.

The new condensation products can be solidified without impairing their tanning and dispersing properties by conventional drying methods, for instance by evaporation in vacuo, more preferably by roller drying or spray drying. The drying is preferably carried out after neutralizing the condensation products for instance with ammonia so that, after adjusting the pH with solid acid reacting substances, for instance sodium bisulfate, oxalic acid and nitric acid or mixtures thereof, pulverulent tannins are obtained, which are non-hygroscopic and readily yield clear solutions with cold water. These solutions have the same properties as the sirupy products. They are standardized by addition of liquid acids, for instance formic acid, acetic acid and hydrochloric acid, to the solutions of the neutral tanning powder.

The invention is further illustrated by the following examples without being restricted thereto:

*Example 1*

130 grams of naphthalene are melted, reacted with 130 grams of sulfuric acid monohydrate and heated to 160° C. The melt is stirred at this temperature for 1 hour. Thereupon the mixture is allowed to cool to 95° C. and 64 grams of o-chlorophenol and 87.5 grams of aqueous formaldehyde (30 percent) are dropped in by means of two dropping funnels within one hour. The mixture is stirred at this temperature for another hour, cooled to 80° C., neutralized with ammonia (about 120 grams of ammonia solution (25 percent)) to pH 7 and adjusted to pH 3.2–3.5 with 25 grams of glacial acetic acid and 5 grams of formic acid. After cooling there is obtained a viscous, pourable sirup which has no chlorophenol odor and easily yields a clear solution in water. The product has a percentage of pure tannin in dry substance of about 56 percent, a concentration of 63 percent and a percentage figure of 89 (filter method). When used as tannin a light, almost white leather is obtained. The dispersing and sludge dissolving action is excellent.

*Example 2*

Naphthalene is sulfonated as described in Example 1 and 128 grams of o-chlorophenol and 120 grams of formaldehyde solution (30 percent) are simultaneously introduced from two dropping funnels at 120° C. within two hours so that the last 5 cc. of formaldehyde are added when the addition of chlorophenol is finished. The sirup which is worked up and standardized according to Example 1 shows similar analytical values; it yields a light leather of good body and has almost the same dispersing action.

Example 3

The process of Example 1 is repeated while using, however, 75 grams of 6-chloro-m-cresol instead of o-chlorophenol. The product obtained yields a leather of somewhat darker shade while the other properties of the product are similar.

Example 4

180 grams of phenanthrene are melted and reacted with 215 grams of concentrated sulfuric acid (98 percent). After one hour's stirring at water bath temperature the mixture is water soluble and can be condensed immediately with 77 grams of o-chlorophenol and 105 grams of formaldehyde according to Example 1. After neutralizing and adjusting the pH a dark sirup is obtained, which yields a clear solution in water and a light grey, flexible leather. The sirup has a percentage figure of about 77 and shows a good dispersing action.

Example 5

180 grams of anthracene are introduced at 120–125° C. while stirring into 360 grams of concentrated sulfuric acid (98 percent), the temperature rising up to about 140° C. After stirring for two hours the mixture is allowed to cool to 100° C., 50 grams of water are added and 64 grams of o-chlorophenol and 85 grams of formaldehyde are added in drops as described in Example 1. The dark sirup obtained after neutralizing and adjusting the pH shows good dispersing properties and yields a grey leather.

Example 6

Naphthalene is sulfonated as described in Example 1 and 87.5 grams of 30 percent aqueous formaldehyde and 64 grams of a chlorination mixture of phenol, which contains 63 percent of o-chlorophenol, 23 percent of p-chlorophenol and 4 percent of phenol, are introduced at the same time from two dropping funnels at 95–100° C. within one hour. 3–5 grams of the formaldehyde are dropped in after the addition of the mixture of chlorophenol is finished. After stirring for one hour at the same temperature and neutralizing with ammonia the reaction product is rendered acid with 25 grams of acetic acid and 5 grams of formic acid. The sirup obtained gives a clear solution in water; it has a percentage of pure tannin in dry substance of about 54 percent and a percentage figure of about 87 percent and yields a light leather. The dispersing and sludge dissolving action is similar to the product obtained according to Example 1.

We claim:

1. The process of preparing water-soluble condensation products suitable for tanning which comprises simultaneously introducing at 80–130° C. 0.4–2 mols of formaldehyde and 0.1–2 mols of o-chlorophenol into 1 mol of a sulfonation mixture of naphthalene prepared by treating naphthalene with sulfonic acid at a temperature of about 140–180° C., said mixture consisting of naphthalene monosulfonic acids and naphthalene disulfonic acids, heating the mixture for about another 15 minutes to 4 hours at 80–130° C., adjusting the product to a pH of about 3–4 and recovering the condensation product.

2. The process of preparing water-soluble condensation products suitable for tanning which comprises simultaneously introducing at 80–130° C. 0.4–2 mols of formaldehyde and 0.1–2 moles of 6-chloro-m-cresol into 1 mol of a sulfonation mixture of naphthalene prepared by treating naphthalene with sulfonic acid at a temperature of about 140–180° C., said mixture consisting of naphthalene monosulfonic acids and naphthalene disulfonic acids, heating the mixture for about another 15 minutes to 4 hours at 80–130° C., adjusting the product to a pH of about 3–4 and recovering the condensation product.

3. As new products, the water-soluble condensates obtained by reacting, at elevated temperature, one mol of at least one sulfonic acid of the formula $R(SO_3H)_n$ wherein R is an aromatic hydrocarbon residue containing at least two condensed nuclei and $n$ is an integer from 1 to 2, with 0.4–2 mols of a lower saturated aliphatic aldehyde and 0.1–2 mols of an o-chlorophenol in a strongly acid medium at least until resulting product is water-soluble, said lower saturated aliphatic aldehyde and o-chlorophenol reactants being added substantially simultaneously to said sulfonic acid reactant.

4. A product of claim 3 wherein the o-chlorophenol is a member of the group consisting of o-chlorophenol and 6-chloro-m-cresol.

5. The process of preparing water-soluble condensation products suitable for tanning which comprises reacting, at elevated temperature, one mol of at least one sulfonic acid of the formula $R(SO_3H)_n$ wherein R is an aromatic hydrocarbon residue containing at least two condensed nuclei and $n$ is an integer from 1 to 2 with 0.4–2 mols of a lower saturated aliphatic aldehyde and 0.1–2 mols of an o-chlorophenol in a strongly acid medium at least until the resulting product is water-soluble, said lower saturated aliphatic aldehyde and o-chlorophenol reactants being added substantially simultaneously to said sulfonic acid reactant.

6. The process of claim 5 wherein R is a naphthalene residue.

7. As new products, the water-soluble condensates obtained by reacting, at elevated temperature, about one mol of 2-naphthalene-sulfonic acid with about 0.5–1.5 mols of o-chlorophenol and about 0.75–1.3 mols of formaldehyde in a strongly acid medium at least until the resulting product is water-soluble, said o-chlorophenol and formaldehyde reactants being added substantially simultaneously to said sulfonic acid reactant.

References Cited in the file of this patent

UNITED STATES PATENTS

| | | |
|---|---|---|
| 2,282,928 | Bauer | May 12, 1942 |
| 2,333,754 | Wassenegger | Nov. 9, 1943 |

FOREIGN PATENTS

| | | |
|---|---|---|
| 695,374 | Germany | Aug. 23, 1940 |